Patented Oct. 9, 1928.

1,686,876

UNITED STATES PATENT OFFICE.

BERRY MARVEL O'HARRA, OF WESTFIELD, AND EDGAR A. SLAGLE, OF TRENTON, NEW JERSEY, ASSIGNORS TO AMERICAN SMELTING AND REFINING COMPANY, OF NEW YORK, N. Y., A CORPORATION OF NEW JERSEY.

METHOD OF MANUFACTURING MAGNESITE BRICK.

No Drawing. Application filed September 17, 1926. Serial No. 136,203.

This invention relates broadly to the method of making refractories for use in metallurgical furnaces, and more particularly to magnesite brick having exceptionally high resistance to the corrosive action of metallurgical slags at the high temperatures at which metallurgical operations may be practiced.

The invention relates further to the method of making magnesite brick which is composed almost entirely of pure magnesium oxide and which therefore is free from iron or other elements which would be readily attacked and corroded by the slags to which said brick may be exposed in use. It also relates to magnesite brick having a dense structure, and mechanical strength such that it will not be distorted or destroyed by the mechanical load to which it may be subjected in use in the furnace. The invention also relates to a method for manufacturing magnesite brick, whereby a strong, dense corrosion resistant brick may be produced.

The invention further consists in the new and novel features of operation and the new and original arrangements and combination of steps in the process hereinafter described, and more particularly set forth in the claims.

The invention also consists in forming a product having the general characteristics, the new and useful application, and the several original features of utility hereinafter set forth and claimed.

Magnesite brick as ordinarily produced at present are made from calcined magnesite which contains naturally, or to which are added, certain agents the purpose of which is to form chemical compounds which bind together the particles of magnesium oxide, and give sufficient strength to the brick to enable it to support the loads to which it may be subjected in use. Ferric oxide, in amounts up to 7 per cent or more of the magnesite, is the agent most generally used, although other "binders" such as clay, sodium silicate, and the like, have been suggested. When bricks made from such mixtures are burned, during the process of manufacture, the iron oxide, or other "binder," unites with a portion of the magnesium oxide to form ferro-magnesian or similar compounds, which are more readily fusible than the magnesium oxide and which consequently partly fuse or sinter, thereby forming a bond between the particles of magnesium oxide. The brick produced as a result of this action is dense and of considerable strength, but of only moderately high refractoriness. In use, when such brick are exposed to the action of corrosive slags at high temperatures, for example, as when they are used for lining reverberatory furnaces for smelting copper ores, they are rapidly corroded by the slag and must soon be replaced. Microscopic examination of such brick, after they have been in use, shows that the corrosion has been caused by the chemical action of the slag upon the ferro-magnesian or other compounds, making up the binder, and that the particles of magnesium oxide are not themselves greatly attacked chemically by the slag, but are carried away mechanically, after the binder, which should have held them together, has been destroyed. It has been suggested to make a brick of much purer calcined magnesite to avoid this difficulty, but all such brick heretofore made have been so weak mechanically, due to the absence of any compound to serve as a binder for the particles of magnesite, that they fail in use for lack of mechanical strength.

By the herein disclosed invention it is possible to manufacture brick, which consists almost entirely of pure magnesium oxide, which has a dense structure, which is strong mechanically and which at the same time has extremely high resistance to the action of corrosive slags at high temperatures. This brick consists of particles of calcined magnesite or magnesia as free as possible from ferric oxide or other impurities which are held together by means of colloidal or very finely divided magnesium oxide, and which may be burned for a sufficient length of time to convert a substantial portion of the magnesium oxide to the mineral periclase.

One method by which this invention may be practiced is as follows:—

As raw material, comparatively pure calcined magnesite, as free as possible from ferric oxide or other impurities, may be selected. This magnesite may first be crushed to whatever size may be desired, preferably being crushed rather fine, as in the ordinary method of manufacture. With this pure calcined magnesite may now be mixed colloidal or semi-colloidal magnesium hydroxide, and sufficient water to give the mixture the proper consistency to be pressed into molds.

The colloidal or semi-colloidal magnesium hydroxide is an exceptionally good binder while the bricks are in the green or unburned state. When heated, in burning the bricks, it gives off water and becomes converted to colloidal or semi-colloidal magnesium oxide, which, in turn, serves as an excellent binder for the brick in the burned state. By continuing the burning operation for a sufficient length of time at the usual temperature of burning magnesite bricks, or at a somewhat higher temperature for a shorter length of time, the magnesium oxide may be partially or wholly converted into the mineral periclase.

Preferably, sufficient magnesium hydroxide may be used to coat or surround each particle of the calcined magnesia with a thin film of the colloidal or semi-colloidal magnesium hydroxide. The quantity most suitable varies, of course, with the size and general character of the calcined magnesia, but, by way of illustration, it may be stated that 5 to 10 per cent of colloidal magnesium hydroxide has been found suitable with a certain calcined magnesite.

The mixture of calcined magnesite, colloidal magnesium hydroxide and water may now be molded into bricks, preferably under high pressure in order to compress the mixture as much as possible, and may then be dried and burned in any suitable form of kiln at the temperature desired. The burning temperature may preferably be about cone 16 or higher, and may be continued for a sufficient length of time to convert a substantial amount or all of the magnesium oxide both that in the binder and that in the particles of calcined magnesite, into the mineral periclase.

By this procedure each brick becomes practically a solid block of periclase and is exceedingly resistant to the action of the most corrosive slags, even those of a ferruginous nature, as well as being exceptionally dense and strong.

The colloidal or semi-colloidal magnesium hydroxide to be mixed with the particles of calcined magnesite may be produced mechanically by comminuting crystalline magnesium oxide to an exceedingly fine or ultra-microscopic size, and emulsifying the product in water. It may also be produced by chemical means, such as by mixing together solutions, one of which may be a solution of a soluble magnesium salt, such as magnesium chloride, and the other a solution containing approximately an equivalent amount of a soluble alkali, such as sodium hydroxide or ammonium hydroxide. The magnesium hydroxide may be precipitated separately from the calcined magnesite, so that it may be washed to rid it of salts, such as sodium chloride, formed when it is precipitated, or it may be precipitated directly in contact with the particles of calcined magnesite. If the latter method of preparing the colloidal magnesium hydroxide is to be used, the calcined magnesite may first be wet with a small amount of water containing in solution the desired amount of the soluble magnesium salt. To this mixture may then be added a water solution of the soluble alkali, containing an amount of the alkali approximately equivalent to the amount of soluble magnesium salt used. The whole may then be thoroughly mixed, during which mixing the soluble magnesium salt and the alkali react to form magnesium hydroxide, which is precipitated as a colloidal, jelly-like film around each individual particle of calcined magnesite.

The brick made by this method contain practically no impurities; hence, they are exceptionally resistant to the corrosive action of slags, even at the highest temperature to which they may be subjected in use. The colloidal magnesia makes a firm binder to unite the coarser particles of magnesite, so that the brick is dense and strong mechanically as well as chemically.

It is obvious that the advantages of this material, in which calcined magnesite is bonded by means of very finely comminuted or colloidal magnesium oxide are not confined to magnesite bricks, but that it may also be used in other forms. For example, the mixture of calcined magnesite and colloidal magnesium hydroxide may be tamped into place as in a furnace bottom, and there be burned in place to convert the magnesium hydroxide to magnesium oxide, thereby to secure the bonding of the calcined magnesite.

This new product, on account of its purity, its denseness and its mechanical strength, is a highly superior refractory for use under any conditions in which it may be desirable to employ magnesite brick. In consequence of its great resistance to corrosion, both that due to chemical action and that due to mechanical causes, furnace linings or other objects made of this brick have a much longer life than those made of the ordinary magnesite brick. Therefore, great savings in metallurgical operations are made possible, since the furnaces or other apparatus in which this new material is employed will last much longer than heretofore before expensive repairs or renewals become necessary, and the cost per ton of metal or other product produced in the furnace is thereby materially decreased.

The process by which this new magnesite brick may be manufactured is remarkably simple to practice, and requires no complicated machinery or operations. It may be carried on at any plant having the ordinary apparatus for making refractories, as the colloidal magnesium hydroxide is not difficult to prepare and may readily be mixed with the calcined magnesite in the commonly used types of mixers.

Although one process for producing this improved product has been set forth and described, it is obvious that various omissions, substitutions and changes may be made in the process or in the separate steps thereof without departing from the spirit of the invention and without modifying or changing the essential features and characteristics of the product produced, and that such product remains substantially the same although slight modifications may be made in its appearance and texture, and in its physical and chemical characteristics.

What is claimed is:

1. Process of manufacturing magnesite brick which consists in crushing calcined magnesite into small particles, mixing with said particles water containing magnesium chloride in amount equivalent to 5 to 10 percent of the calcined magnesite, adding to said mixture an aqueous solution of sodium hydroxide or ammonium hydroxide in amount approximately equivalent to the magnesium chloride, thereby to form magnesium hydroxide in contact with the particles of magnesite, compressing the mixture into bricks, burning the bricks, whereby the magnesium hydroxide is converted to magnesium oxide, and continuing the burning at a higher temperature to convert the magnesium oxide into periclase.

2. Process of manufacturing magnesite brick which consists in crushing calcined magnesite into small particles, mixing with said particles water containing a small proportion of a soluble magnesium salt, adding to said mixture an aqueous solution of soluble alkali in amount substantially equivalent to the dissolved magnesium salt, thereby to form a small proportion of magnesium hydroxide in contact with the particles of magnesite, compressing the mixture into bricks, burning the bricks whereby the magnesium hydroxide is converted to magnesium oxide, and continuing the burning at a higher temperature to convert the magnesium oxide into periclase.

3. Process of manufacturing magnesite brick which consists in mixing with small particles of calcined magnesite water containing a small proportion of soluble magnesium salt, adding to said mixture an aqueous solution of soluble alkali in amount approximately equivalent to the dissolved magnesium salt, thereby to form a small proportion of magnesium hydroxide in contact with the particles of calcined magnesite, compressing the mixture into bricks and burning the bricks, whereby the magnesium hydroxide is converted to magnesium oxide.

4. The process of manufacturing magnesite brick which comprises crushing calcined magnesite into small particles, mixing therewith a small proportion of colloidal magnesium hydroxide for forming a temporary binder for the plastic mass, forming the mixture to bricks and burning the bricks to convert the colloidal magnesium hydroxide into colloidal magnesium oxide, said oxide forming a permanent binder for the bricks.

In testimony whereof we have hereunto set our hands.

BERRY MARVEL O'HARRA.
EDGAR A. SLAGLE.